US012746742B2

(12) United States Patent
Taniguchi et al.

(10) Patent No.: US 12,746,742 B2
(45) **Date of Patent: *Sep. 29, 2026**

(54) CO-EXTRUDED SHEET

(71) Applicant: MAXELL, LTD., Kyoto (JP)

(72) Inventors: Satoki Taniguchi, Otokuni-gun (JP); Atsushi Yusa, Otokuni-gun (JP); Satoshi Yamamoto, Otokuni-gun (JP); Toshiharu Goto, Otokuni-gun (JP); Kei Mizutani, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 54 days.

This patent is subject to a terminal disclaimer.

(21) Appl. No.: 18/574,928

(22) PCT Filed: Oct. 21, 2022

(86) PCT No.: PCT/JP2022/039304

§ 371 (c)(1),
(2) Date: Dec. 28, 2023

(87) PCT Pub. No.: WO2023/188487

PCT Pub. Date: Oct. 5, 2023

(65) Prior Publication Data

US 2025/0010589 A1 Jan. 9, 2025

(30) Foreign Application Priority Data

Mar. 31, 2022 (JP) ................................ 2022-059973

(51) Int. Cl.
*B32B 27/06* (2006.01)
*B29C 48/08* (2019.01)
(Continued)

(52) U.S. Cl.
CPC ............ *B32B 27/065* (2013.01); *B29C 48/08* (2019.02); *B29C 48/21* (2019.02); *B32B 5/18* (2013.01);
(Continued)

(58) Field of Classification Search
CPC .......... B32B 5/18–5/245; B32B 27/365; C08J 9/00–9/42; C08J 2201/00–2201/0547;
(Continued)

(56) References Cited

U.S. PATENT DOCUMENTS 6,492,015 B1 * 12/2002 Aoki ......................... B32B 5/18 428/318.6
9,598,577 B1 * 3/2017 Groote .................... C08L 83/10
(Continued)

FOREIGN PATENT DOCUMENTS

JP H08-174780 A 7/1996
JP 2000-052370 A 2/2000
(Continued)

OTHER PUBLICATIONS

"Lupilon E-2000". Mitsubishi Engineering-Plastics Corp., pp. 1-2; Retrieved Jan. 14, 2026.*

(Continued)

*Primary Examiner* — Prashant J Khatri
(74) *Attorney, Agent, or Firm* — Oliff PLC

(57) ABSTRACT

A co-extruded sheet reduces swelling and/or cracking of the surface occurring during thermal shaping such as vacuum forming and provides improved mechanical strength. A co-extruded sheet contains a polycarbonate resin, and includes a core layer formed from a foam resin and skin layers formed from a non-foaming resin. The skin layer is laminated to one major surface of the core layer, while the skin layer is laminated to the other major surface of the core layer. The co-extruded sheet has a density of 0.4 to 0.9
(Continued)

g/cm³. The co-extruded sheet has a thickness of 1 to 5 mm and satisfies expression (1): $0.10 \leq (t1+t2)/T \leq 0.5$. In expression (1), t1 indicates the thickness of the skin layer, t2 indicates the thickness of the second skin layer, and T indicates the thickness of the co-extruded sheet.

18 Claims, 5 Drawing Sheets

(51) Int. Cl.

| | |
|---|---|
| ***B29C 48/21*** | (2019.01) |
| ***B32B 5/18*** | (2006.01) |
| ***B32B 7/02*** | (2019.01) |
| ***B32B 27/28*** | (2006.01) |
| ***B32B 27/36*** | (2006.01) |

(52) U.S. Cl.

CPC .............. *B32B 7/02* (2013.01); *B32B 27/283* (2013.01); *B32B 27/36* (2013.01); *B32B 27/365* (2013.01); *B32B 2250/03* (2013.01); *B32B 2250/40* (2013.01); *B32B 2266/0264* (2013.01); *B32B 2307/308* (2013.01); *B32B 2307/546* (2013.01); *B32B 2307/72* (2013.01); *B32B 2307/7376* (2023.05); *B32B 2451/00* (2013.01)

(58) Field of Classification Search

CPC .......................... C08J 2203/00–2203/22; C08J 2205/00–2205/10

See application file for complete search history.

(56) References Cited

U.S. PATENT DOCUMENTS

| | | | | |
|---|---|---|---|---|
| 10,632,663 | B2 | 4/2020 | Yusa et al. | |
| 2016/0002429 | A1 | 1/2016 | Donea et al. | |
| 2017/0113445 | A1* | 4/2017 | Rowles | B32B 27/18 |

FOREIGN PATENT DOCUMENTS

| | | | |
|---|---|---|---|
| JP | 3568655 | B2 | 9/2004 |
| JP | 3654697 | B2 | 6/2005 |
| JP | 6139038 | B1 | 5/2017 |

OTHER PUBLICATIONS

"Lupilon H-3000". Mitsubishi Engineering-Plastics Corp., pp. 1-2; Retrieved Jan. 14, 2026.*

* cited by examiner

CO-EXTRUDED SHEET

TECHNICAL FIELD

The present disclosure relates to a co-extruded sheet containing an engineering plastic, particularly a polycarbonate resin.

BACKGROUND ART

Recently, the attention paid to foam resin has been growing as it can achieve a weight reduction of a resin molding to increase convenience and also help reduce emissions of carbon dioxide. Methods of molding a foam resin include physical foam molding and chemical foam molding. Chemical foam molding uses a blowing agent that is a chemical blowing agent. Chemical blowing agents have a high environmental burden and thus are not preferable from the viewpoint of protecting the earth's environment. Physical foam molding uses a blowing agent that is a physical blowing agent, such as nitrogen or carbon dioxide. Physical blowing agents have a low environmental burden and thus are preferable from the viewpoint of protecting the earth's environment. One physical foam-molding method that foams engineering plastics and/or super engineering plastics with high heat resistance involves shearing and kneading molten engineering and/or super engineering plastic resins together with a supercritical fluid at high pressure and dissolving them all.

Japanese Patent No. 6139038 (Patent Document 1) discloses a method of manufacturing a foam molding using a physical blowing agent such as nitrogen or carbon dioxide at relatively low pressure, instead of a high-pressure supercritical fluid. This method enables formation of fine foam cells in a resin molding with a relatively simple process using a physical blowing agent at low pressure without using special high-pressure equipment. Patent Document 1 further discloses a method of forming a foam molding by injection molding and extrusion molding.

Injection molding enables production of a foam molding with a complex shape. However, the surface layer of the molten resin flows around within the mold while being cooled and solidified. In this process, a relatively thin non-foamed skin layer is formed as the surface layer of the foam molding. On the other hand, extrusion molding, with less mold-size and load restrictions than injection molding, is suitable for consecutively manufacturing foam moldings of a single shape and a single thickness. In addition, a sheet-shaped foam molding obtained by extrusion molding may be vacuum formed, for example, to shape it into a shape that is complex to some degree or into a relatively large size, for example. However, with extrusion molding, when the molten resin is discharged through the die outlet and cooled and solidified, a skin layer cannot be readily formed on the surface of the foam molding. Foam moldings with a relatively thin skin layer and foam moldings without a skin layer have a surface with inferior appearance design quality compared with foam moldings with a skin layer of sufficient thickness. Another problem with a foam molding obtained by extrusion molding is that pressure release during discharge of the molten resin through the die outlet destroys air bubbles, potentially causing irregularities on the surface of the foam molding and thus degrading appearance design quality.

In addition, Patent Document 1 does not consider a foam molding of a polycarbonate resin composed of an amorphous resin that is vacuum formable, nor does it consider ensuring the surface smoothness of the foam molding when heated to a temperature exceeding the glass-transition temperature of the polycarbonate resin. As after as non-foaming resins are concerned, crystalline resins are unlikely to experience significant deformation or dimensional change when heated at a temperature higher than the glass-transition temperature but lower than the melting point.

However, among non-foaming resins, amorphous resins are susceptible to thermal deformation when heated to a temperature higher than the glass-transition temperature (the glass-transition temperature of polycarbonate resin is about 145° C.). This suggests that, when a foam molding made of an amorphous resin (i.e., polycarbonate resin) is heated at a temperature not lower than its glass-transition temperature, it is more difficult to prevent deformation of its surface, such as swelling of the surface of the foam resin caused by bubbles formed inside the foam molding, or dimensional changes of the foam molding.

To form a skin layer with sufficient thickness, Japanese Patent No. 3654697 (Patent Document 2) discloses a method of manufacturing a thermoplastic-resin foam sheet. This method of manufacturing a thermoplastic-resin foam sheet allows a skin layer to be formed readily on the surface of the thermoplastic-resin foam sheet by extrusion molding. JP 2000-52370 A (Patent Document 3) discloses a method of manufacturing a multi-layer laminated molding. This multi-layer laminated molding is formed by co-extrusion molding, including a core layer and skin layers made of a foam resin. The manufacturing methods of Patent Documents 2 and 3 use commodity plastics with relatively low heat resistance and mechanical strength, such as polypropylene or polystyrene, as the main resin material, and do not use an engineering plastic with good heat resistance and mechanical strength, particularly a polycarbonate resin. Further, the objectives of the manufacturing methods of Patent Documents 2 and 3 are to enable easy or stable manufacturing of a foam molding, and not to improve heat resistance and mechanical strength. Further, they cannot enable a weight reduction if the thickness of the skin layer is too large, i.e., the thickness of the core layer is too small.

Japanese Patent No. 3568655 (Patent Document 4) discloses an extruded laminated foam sheet of a polycarbonate-based resin having a plurality of extruded foam sheets of the polycarbonate-based resin bonded together. However, the extruded laminated foam sheet of a polycarbonate-based resin of Patent Document 4 is produced by cutting and laminating extruded foam sheets of the polycarbonate-based resin to produce a polycarbonate-based resin foam sheet with a relatively large thickness; the skin layer at the surface is not regulated.

Yet another problem with a resin molding made of a foam resin is that reducing its density to improve light-weight properties decreases its mechanical strength. Particularly, a foam molding made of a polycarbonate resin required to have mechanical strength is disadvantageous relative to a resin molding made of an amorphous resin, due to the significantly lower mechanical strength of the former.

JP H08-174780 A (Patent Document 5; "H08" stands for Heisei 8, i.e., the year 1996) discloses an extruded laminated polycarbonate-resin foam sheet with high expansion ratio produced by co-extrusion molding. This extruded laminated polycarbonate-resin foam sheet has good heating workability, particularly deep-drawing workability, and also has good appearance design quality and mechanical strength. Patent Document 5 discloses heating-induced dimensional changes occurring when the extruded laminated polycarbonate-resin foam sheet is heated in an atmosphere at a relatively low temperature of 170° C.

PRIOR ART DOCUMENTS

Patent Documents

Patent Document 1: Japanese Patent No. 6139038
Patent Document 2: Japanese Patent No. 3654697
Patent Document 3: JP 2000-52370 A
Patent Document 4: Japanese Patent No. 3568655
Patent Document 5: JP H08-174780 A

SUMMARY OF THE INVENTION

In recent years, there has been a growing demand that, in thermally shaping a co-extruded sheet into a desired shape by vacuum forming, for example, one should be able to form the sheet in a short period of time using a relatively high heating temperature of 200° C. or higher and utilizing drawdown (a phenomenon in which a molten resin sags due to its own weight) to improve productivity. However, when a co-extruded sheet having a core layer made of a foam resin and skin layers made of a non-foaming resin laminated to the major surfaces of the core layer is heated at a high temperature of 200° C. or higher, bubbles in the core layer coated with the skin layers thermally expand and can easily merge. As a result, for example, the skin layers may swell from the major surfaces of the co-extruded sheet or the co-extruded sheet itself may develop a crack, deteriorating the appearance design quality of the co-extruded sheet.

In addition, co-extrusion molding is an integrated molding method in which a core layer and skin layers are brought together inside a die during co-extrusion molding. As such, bubbles in the core layer may expand during pressure release through the die outlet, causing problems in bubble-size uniformity. Particularly, if the pressure and concentration of the physical blowing agent are increased, the density of expanding bubbles increases, resulting in a non-uniform bubble size in the core layer of the co-extruded sheet, and swollen portions are produced in the co-extruded sheet after heating to 200° C. or higher.

In addition, a laminated polycarbonate-resin foam sheet with high expansion ratio as shown in Patent Document 5, while providing good light-weight properties, has a lower mechanical strength than a laminated polycarbonate-resin foam sheet with low expansion ratio.

The present inventors conducted extensive research and discovered that the density of a co-extruded sheet and the thickness of its skin layers can be adjusted to provide a co-extruded sheet, including a core layer made of a foam resin intended to reduce weight, that provides improved mechanical strength and experiences reduced deterioration of appearance design quality during vacuum forming.

It is to be noted here that Patent Document 5 does not propose improving the mechanical strength of a laminated polycarbonate-resin foam sheet from the viewpoint of density or skin-layer thickness nor reducing deterioration of appearance design quality during vacuum forming.

An object of the present disclosure is to provide a co-extruded sheet containing a polycarbonate resin that reduces swelling of the surface occurring during thermal shaping such as vacuum forming and/or cracking of the co-extruded sheet and that also provides improved mechanical strength.

To solve the above-identified problems, the present disclosure provides the following solution: A co-extruded sheet according to the present disclosure may contain a polycarbonate resin. It may include: a core layer formed from a foam resin; a first skin layer formed from a non-foaming resin and laminated to one major surface of the core layer; and a second skin layer laminated to another major surface of the core layer. The co-extruded sheet may have a density of 0.4 to 0.9 g/cm$^3$, have a thickness of 1 to 5 mm and satisfy the following expression, (1):

$$0.10 \leq (t1 + t2)/T \leq 0.5. \quad (1)$$

In expression (1), t1 indicates a thickness of the first skin layer, t2 indicates a thickness of the second skin layer, and T indicates a thickness of the co-extruded sheet.

When heated for 30 minutes in a heated atmosphere at 250° C., the co-extruded sheet may include a swollen portion produced on a surface of the co-extruded sheet due to the heating. A thickness t3 of the co-extruded sheet inclusive of the swollen portion may be not larger than 1.5 times an average thickness t4 of the co-extruded sheet before the heating. The co-extruded sheet after the heating may have less than one swollen portion per 100 cm$^2$ of the surface.

A co-extruded sheet may contain a polycarbonate resin. It may include: a core layer formed from a foam resin; a first skin layer formed from a non-foaming resin and laminated to one major surface of the core layer; and a second skin layer laminated to another major surface of the core layer. The co-extruded sheet may have a density of 0.4 to 0.9 g/cm$^3$, have a thickness of 1 to 5 mm and satisfy the following expression, (1):

$$0.10 \leq (t1 + t2)/T \leq 0.5. \quad (1)$$

In expression (1), t1 indicates a thickness of the first skin layer, t2 indicates a thickness of the second skin layer, and T indicates a thickness of the co-extruded sheet.

When the co-extruded sheet is heated for 30 minutes in a heated atmosphere at 250° C., an average thickness t5 of the co-extruded sheet after the heating may be not larger than 1.5 times an average thickness t4 of the co-extruded sheet before the heating.

A co-extruded sheet may contain a polycarbonate resin. It may include: a core layer formed from a foam resin; a first skin layer formed from a non-foaming resin and laminated to one major surface of the core layer; and a second skin layer laminated to another major surface of the core layer. The co-extruded sheet may have a density of 0.4 to 0.9 g/cm$^3$, have a thickness of 1 to 5 mm and satisfy the following expression, (1):

$$0.10 \leq (t1 + t2)/T \leq 0.5. \quad (1)$$

In expression (1), t1 indicates a thickness of the first skin layer, t2 indicates a thickness of the second skin layer, and T indicates a thickness of the co-extruded sheet.

The core layer may have an expansion ratio of 1.6 to 3.3.

The co-extruded sheet according to the present disclosure reduces swelling of the surface occurring during thermal shaping such as vacuum forming and/or cracking of the co-extruded sheet, and also provides good light-weight properties and mechanical strength.

EMBODIMENTS FOR CARRYING OUT THE INVENTION

Figure 1:
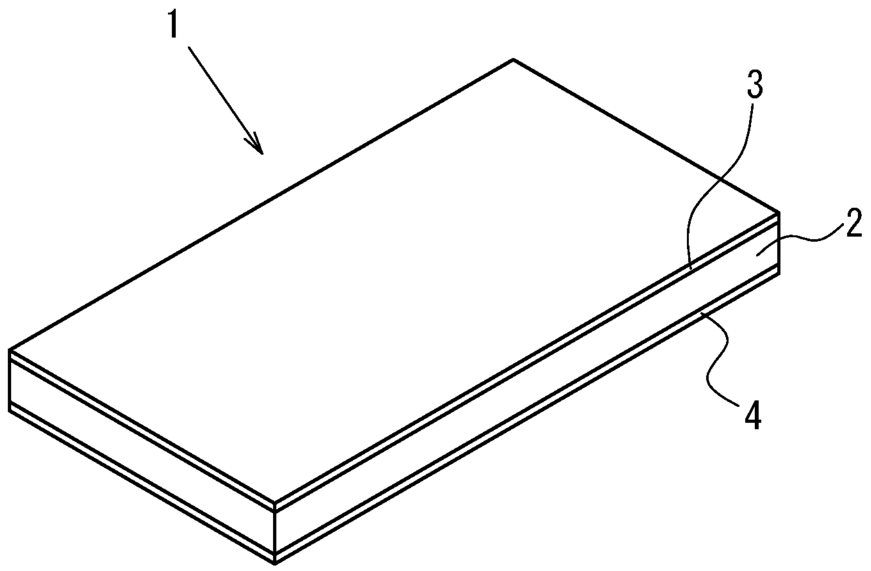
FIG. 1 is a perspective view of a co-extruded sheet according to embodiments.

To solve the above-identified problems, the present disclosure provides the following solution: A co-extruded sheet according to the present disclosure may contain a polycarbonate resin. It may include: a core layer formed from a foam resin; a first skin layer formed from a non-foaming resin and laminated to one major surface of the core layer; and a second skin layer laminated to another major surface of the core layer. The co-extruded sheet may have a density of 0.4 to 0.9 g/cm$^3$. The co-extruded sheet may have a thickness of 1 to 5 mm and satisfy the following expression, (1):

$$0.10 \leq (t1+t2)/T \leq 0.5. \quad (1)$$

In expression (1), t1 indicates a thickness of the first skin layer, t2 indicates a thickness of the second skin layer, and T indicates a thickness of the co-extruded sheet.

When heated for 30 minutes in a heated atmosphere at 250° C., the co-extruded sheet may include a swollen portion produced on a surface of the co-extruded sheet due to the heating. A thickness t3 of the co-extruded sheet inclusive of the swollen portion may be not larger than 1.5 times an average thickness t4 of the co-extruded sheet before the heating. The co-extruded sheet after the heating may have less than one swollen portion per 100 cm$^2$ of the surface.

As the density of the co-extruded sheet and the thickness of the skin layers relative to the thickness of the co-extruded sheet are regulated in this manner, swelling and/or cracking occurring at the surface during thermal shaping such as vacuum forming will be prevented and, at the same time, good light-weight properties and mechanical strength will be provided. Further, deterioration of the appearance design quality of the co-extruded sheet during thermal shaping such as vacuum forming will be reduced. A co-extruded sheet may contain a polycarbonate resin. It may include: a core layer formed from a foam resin; a first skin layer formed from a non-foaming resin and laminated to one major surface of the core layer; and a second skin layer laminated to another major surface of the core layer. The co-extruded sheet may have a density of 0.4 to 0.9 g/cm$^3$, have a thickness of 1 to 5 mm and satisfy the following expression, (1):

$$0.10 \leq (t1+t2)/T \leq 0.5. \quad (1)$$

In expression (1), t1 indicates a thickness of the first skin layer, t2 indicates a thickness of the second skin layer, and T indicates a thickness of the co-extruded sheet.

When the co-extruded sheet is heated for 30 minutes in a heated atmosphere at 250° C., an average thickness t5 of the co-extruded sheet after the heating may be not larger than 1.5 times an average thickness t4 of the co-extruded sheet before the heating. As the density of the co-extruded sheet and the thickness of the skin layers relative to the thickness of the co-extruded sheet are regulated in this manner, swelling and/or cracking occurring at the surface during thermal shaping such as vacuum forming will be prevented and, at the same time, good light-weight properties and mechanical strength will be provided. Further, deterioration of the appearance design quality of the co-extruded sheet during thermal shaping such as vacuum forming will be reduced.

A co-extruded sheet may contain a polycarbonate resin. It may include: a core layer formed from a foam resin; a first skin layer formed from a non-foaming resin and laminated to one major surface of the core layer; and a second skin layer laminated to another major surface of the core layer. The co-extruded sheet may have a density of 0.4 to 0.9 g/cm$^3$, have a thickness of 1 to 5 mm and satisfy the following expression, (1):

$$0.10 \leq (t1+t2)/T \leq 0.5. \quad (1)$$

In expression (1), t1 indicates a thickness of the first skin layer, t2 indicates a thickness of the second skin layer, and T indicates a thickness of the co-extruded sheet.

The core layer may have an expansion ratio of 1.6 to 3.3. This will reduce deterioration of the appearance design quality of the co-extruded sheet during thermal shaping such as vacuum forming and, at the same time, provide even better light-weight properties and mechanical strength.

The polycarbonate resin contained in the first and second skin layers may have a melt volume-flow rate 1.0 to 5 times a melt volume-flow rate of the polycarbonate resin contained in the core layer. This will prevent the bubble size in the core layer from becoming non-uniform.

The polycarbonate resin contained in the first and second skin layers may have a melt volume-flow rate 1.5 to 3 times a melt volume-flow rate of the polycarbonate resin contained in the core layer. This will improve vacuum formability.

The co-extruded sheet may have a density not higher than 0.82 g/cm$^3$. This will provide even better light-weight properties and mechanical strength.

When the co-extruded sheet is heated for 30 minutes in an atmosphere at 200° C., the co-extruded sheet may have a dimensional change ratio of −5 to 0% as measured along one of a direction of extrusion and a width direction perpendicular to the direction of extrusion in planner view. This will ensure the dimensional stability of the co-extruded sheet during thermal shaping such as vacuum forming.

The co-extruded sheet may have a specific flexural modulus not lower than 1.5 GPa·cm$^3$/g. This will reduce the weight of the co-extruded sheet and, at the same time, improve its mechanical strength.

The co-extruded sheet may have a specific flexural modulus not lower than 2 GPa·cm$^3$/g. This will further improve the light-weight properties and mechanical strength of the co-extruded sheet.

The co-extruded sheet may further include a decorative film. The decorative film may be laminated to an outer surface of at least one of the first and second skin layers. This will provide a design depending on the application of the molded product resulting from vacuum forming of the co-extruded sheet.

Now, embodiments of the co-extruded sheet, denoted by numeral 1, of the present disclosure will be specifically described with reference to FIGS. 1 to 5. The same and corresponding elements in the drawings are labeled with the same reference characters, and their description will not be repeated. For ease of explanation, the drawings to which reference will be made below show elements in a simplified or schematic manner, and/or do not show some elements.

The co-extruded sheet 1 is made of a polycarbonate resin. The co-extruded sheet 1 according to the present embodiments has a sheet shape.

The co-extruded sheet 1 is produced by co-extrusion molding of a molten polycarbonate resin. The resin used in the present disclosure may be any other engineering plastic that contains a polycarbonate resin. An engineering plastic is a thermoplastic resin with an under-load deflection temperature not lower than 100° C. The engineering plastic may be, for example, a polycarbonate resin (PC) or, instead, a modified polyphenylene ether (m-PPE) or syndiotactic polystyrene (SPS), for example. The resin used in the co-extruded sheet 1 of the present disclosure may contain at least one selected from the group consisting of these engineering plastics.

The resin material of the co-extruded sheet 1 is only required to be an extrusion-moldable engineering plastic. An ultraviolet absorbing agent and/or an anti-aging agent, for example, may be added to the resin material of the co-extruded sheet 1.

The co-extruded sheet 1 has a density of 0.4 to 0.9 g/cm$^3$. If the density of the co-extruded sheet 1 is 0.4 to 0.9 g/cm$^3$, both weight reduction and improvement of strength will be achieved. More preferably, the density of the co-extruded sheet 1 may be 0.4 to 0.82 g/cm$^3$. This will provide even better light-weight properties and mechanical strength.

Figure 2:
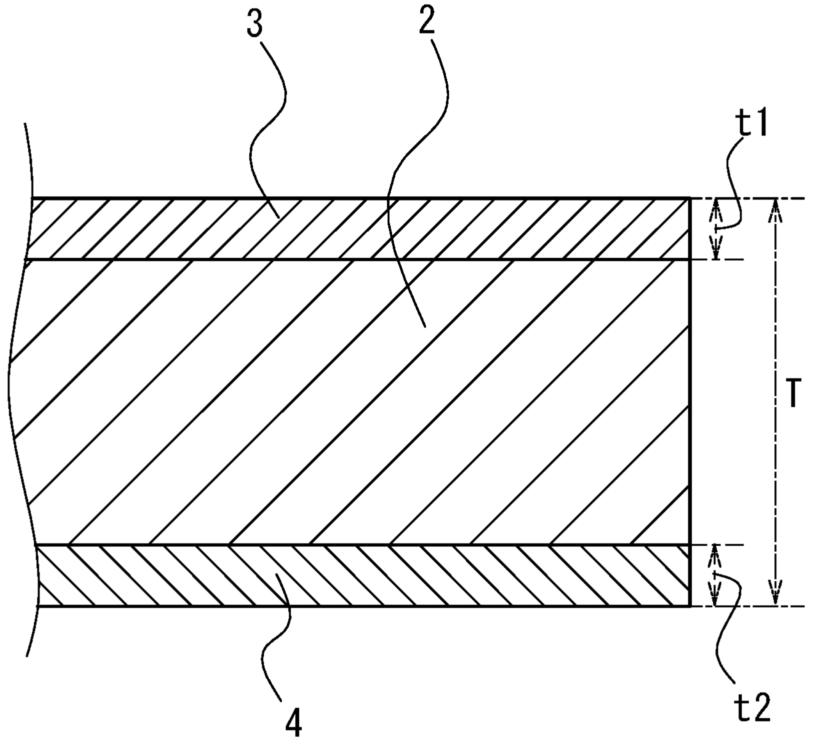
FIG. 2 is a cross-sectional view of the co-extruded sheet shown in FIG. 1.

As shown in FIG. 1, the co-extruded sheet 1 includes a core layer 2, a skin layer 3 laminated to one major surface of the core layer 2, and a skin layer 4 laminated to the other major surface of the core layer 2. As shown in FIG. 2, the co-extruded sheet 1 has a thickness T of 1 to 5 mm.

The core layer 2 is formed from a foam resin. The core layer 2 may be formed by foam molding of a molten polycarbonate resin. This means that the core layer 2 has a large number of air bubbles. Each of these bubbles has a generally elliptic shape extended in the direction of extrusion in a cross-sectional view of the layer taken along a plane in the direction of extrusion during extrusion molding and in the thickness direction. Bubbles contained in the core layer 2 that are located at and near the middle of the core layer 2 as determined along the thickness direction has larger bubble diameters than bubbles 21 located near the ends of the core layer 2 as determined along the thickness direction. The bubble diameter of bubbles 21 gradually decreases as it goes from the middle of the core layer 2 as determined along the thickness direction toward the ends thereof as determined along the thickness direction.

As shown in FIG. 2, the skin layer 3 is formed from a non-foaming resin. This means that the skin layer 3 is not foam molded. The skin layer 3 is extruded by co-extrusion molding through the die outlet in a non-foamed state and laminated integrally to the core layer 2. The skin layer 3 has a thickness t1.

The skin layer 3 may use a thermoplastic resin that can bond well to the core layer 2. More specifically, it is particularly preferable that the resin material of the skin layer 3 is the same resin material that forms the core layer 2. Further, to strengthen the skin layer 3, the skin layer 3 may be formed from a reinforced resin containing an inorganic filler. This construction of the skin layer 3 will achieve both weight reduction and improvement of strength while efficiently improving strength. The inorganic filler may be, for example, glass fiber, carbon fiber, aramid fiber, talc or mica.

The skin layer 4 has a thickness t2. The skin layer 4 is the same as the skin layer 3 except that it is laminated to the other major surface of the core layer 2. As such, no specific description of the skin layer 4 will be given.

The thickness t1 of the skin layer 3 and the thickness t2 of the skin layer 4 are measured in the following manner: The co-extruded sheet 1 is cut along the width direction, down in the thickness direction, and the resulting cut surface is observed with a microscope. In the present disclosure, the microscope used is a Type No. VHX-6000 from Keyence Corporation. A magnification of the microscope that allows determination of the bubble diameter at the interface between the skin layer 3 and core layer 2 of the co-extruded sheet 1 is sufficient. The cut surface of the co-extruded sheet 1 is equally divided into 16 sub-sections that are arranged in the width direction; from among the large number of bubbles present in the cut surface of the co-extruded sheet 1, 15 bubbles are selected that are located on the imaginary borderlines of the sub-sections and close to the surfaces of the co-extruded sheet 1; among these bubbles, the one closest to a surface of the co-extruded sheet 1 is identified. Another imaginary line is drawn that runs through the uppermost point of this closest bubble and perpendicular to the thickness direction. The portion located inward of the imaginary line as determined along the thickness direction is treated as a core layer 2, and the portion located outward along the thickness direction is treated as a skin layer 3. The boundary between the core layer 2 and skin layer 4 is defined in the same manner, and the thickness t1 of the skin layer 3 and the thickness t2 of the skin layer 4 are measured. To provide a thickness T of the co-extruded sheet 1 that is as uniform as possible upon co-extrusion molding, each of the thickness t1 of the skin layer 3 and the thickness t2 of the skin layer 4 is preferably not smaller than 0.050 mm.

The ratio of the total thickness of the skin layers to the thickness T of the co-extruded sheet 1 is to be 0.10 to 0.5, where the total thickness is the sum of the thickness t1 of the skin layer 3 and the thickness t2 of the skin layer 4. That is, the co-extruded sheet 1 is to satisfy the following expression, (1):

$$0.10 \leq (t1 + t2)/T \leq 0.5. \tag{1}$$

If the ratio of the total thickness of the skin layers (t1+t2) to the thickness T of the co-extruded sheet 1 is lower than 0.10, the reinforcing effect, in terms of mechanical strength, of the non-foaming resin of the skin layers is insufficiently produced, decreasing a mechanical strength such as specific flexural modulus. On the other hand, if the ratio of the total thickness of the skin layers (t1+t2) to the thickness T of the co-extruded sheet 1 is higher than 0.5, this means increased density of the co-extruded sheet 1. As a result, the co-extruded sheet 1 loses light-weight properties that would otherwise be provided by foaming. The ratio of the total thickness of the skin layers (t1+t2) to the thickness T of the co-extruded sheet 1 is preferably in the range of 0.15 to 0.45, and more preferably in the range of 0.2 to 0.4. As the ratio of the total thickness of the skin layers (t1+t2) to the thickness T of the co-extruded sheet 1 is in such a range, the specific flexural modulus of the sheet is improved while the reduced density reduces its weight.

Further, as the ratio of the total thickness of the skin layers (t1+t2) to the thickness T of the co-extruded sheet 1 is in the range of 0.2 to 0.4, a certain thickness of the core layer 2 is provided in which irregular-sized bubbles have been uniformed, while secondary workability in vacuum forming, for example, is improved.

Regulating the density of the co-extruded sheet 1 and the thickness of the skin layers 3 and 4 (t1+t2) relative to the thickness T of the co-extruded sheet 1 in this manner will reduce swelling and/or cracking occurring at the surface during thermal shaping such as vacuum forming and, at the same time, provide good light-weight properties and mechanical strength.

The melt volume-flow rate (hereinafter referred to as "MVR") of the polycarbonate resin contained in the skin layer 3 is equal to the MVR of the polycarbonate resin contained in the core layer 2 or higher than the MVR of the polycarbonate resin contained in the core layer 2. The MVR of the polycarbonate resin contained in the skin layer 3 is to be 1.0 to 5 times, preferably 1.5 to 3 times the MVR of the polycarbonate resin contained in the core layer 2.

As the MVR of the resin contained in the skin layer 3 is equal to the MVR of the resin contained in the core layer 2 or higher than the MVR of the resin contained in the core layer 2, the temperature of the resin forming the skin layer 3 can be lowered as much as possible directly after discharge through the die outlet during extrusion molding. This reduces the viscosity of the skin layer 3 directly after discharge through the die outlet, thereby preventing swelling or rupturing of the surface of the skin layer 3, which would be caused by the non-uniform size of the bubbles contained in the core layer 2. In other words, if the ratio of the MVR of the resin contained in the skin layer 3 were lower than 1.0, this would make it difficult to lower the resin temperature, making it difficult to prevent swelling or rupturing of the surface of the skin layer 3. Further, if the ratio of the MVR of the resin contained in the skin layer 3 is not lower than 1.5, it will be yet easier to prevent the size of the bubbles in the core layer 2 from becoming non-uniform during extrusion molding and, at the same time, reduce the pre-heating time for vacuum forming and thus improve productivity. On the other hand, if the ratio of the MVR of the resin contained in the skin layer 3 is higher than 5, it is necessary to excessively lower the MVR of the resin forming the core layer 2 in order to cause the resin forming the skin layer 3 to properly flow within the die during extrusion molding. Further, if the ratio of the MVR of the resin contained in the skin layer 3 is not higher than 3, irregular-sized bubbles in the core layer 2 of the co-extruded sheet 1 are more likely to become uniform, thereby improving secondary workability in vacuum forming, for example, of the co-extruded sheet 1. In view of this, to provide the appropriate fluidity of the resins forming the core layer 2 and skin layer 3 during extrusion molding and regulate viscosity to prevent swelling or rupturing of the surface of the skin layer 3, the MVR of the polycarbonate resin contained in the skin layer 3 is to be 1.0 to 5 times, preferably 1.5 to 3 times the MVR of the polycarbonate resin contained in the core layer 2. The same applies to the skin layer 4/core layer 2.

The MVR of the resins contained in the skin layer 3 and core layer 2 is measured by plastic flow characteristic testing with a capillary rheometer and a slit-die rheometer (in accordance with JIS K7199 and ISO 11443). In the present disclosure, measurement is done where the length of the capillary die is 5 mm, the inner diameter is 1 mm and the measurement temperature is 300° C.

As disclosed in Patent Document 1 mentioned above, the core layer 2 of the present disclosure is preferably foam molded using a physical blowing agent with relatively low pressure, such as nitrogen or carbon dioxide, where nitrogen is more preferable. This will allow the pressure of the physical blowing agent to be set to 1 to 6 MPa, which is relatively low, thereby forming a large number of fine bubbles. This will further prevent swelling, for example, during heating at a high temperature in vacuum forming. The average bubble diameter of bubbles is to be not smaller than 0.1 mm, and not larger than 1.0 mm, and preferably not larger than 0.3 mm. The expansion ratio of the core layer 2 is to be not lower than 1.6, and not higher than 3.3. This will reduce deterioration of the appearance design quality of the co-extruded sheet during thermal shaping such as vacuum forming and, at the same time, provide even better light-weight properties and mechanical strength. The expansion ratio of the core layer 2 is to be not higher than 3.1. This will provide even better light-weight properties and mechanical strength.

The co-extruded sheet 1 is shaped into various shapes through vacuum forming. Typically, during vacuum forming, the co-extruded sheet 1 is heated to about 200° C., which initiates drawdown, and then deposited on the die, for example, and experiences vacuum suction so as to be shaped.

This means that the amount of deformation of the co-extruded sheet 1 in response to the heating temperature during vacuum forming (i.e., dimensional change ratio during heating) is preferably small. When the co-extruded sheet 1 is heated for 30 minutes in an atmosphere at 200° C., the co-extruded sheet may have a dimensional change ratio of −5% to 0% in the direction of extrusion. Further, the co-extruded sheet 1 may have a dimensional change ratio of −5 to 0% in the width direction. In other words, the co-extruded sheet 1 has a dimensional change ratio of −5 to 0% in one of the direction of extrusion and the width direction. Alternatively, the co-extruded sheet 1 has a dimensional change ratio of −5 to 0% in both the direction of extrusion and the width direction. The width direction is the direction perpendicular to the above-mentioned direction of extrusion in planner view. Thus, the co-extruded sheet 1 has good dimensional stability during heating.

The dimensional change ratio in the direction of extrusion can be calculated by the following expression:

dimensional change ratio in direction of extrusion (%)={(gauge length in direction of extrusion after heating—gauge length in direction of extrusion before heating)/gauge length in direction of extrusion before heating}×100

The dimensional change ratio in the width direction can be calculated by the following expression:

dimensional change ratio in width direction (%)={(gauge length in width direction after heating—gauge length in width direction before heating)/gauge length in width direction before heating}×100

The co-extruded sheet 1 has a specific flexural modulus not lower than 1.5 GPa·cm$^3$/g. A specific flexural modulus is the flexural modulus of the co-extruded sheet 1 divided by the density of the co-extruded sheet 1. As such, the higher the specific flexural modulus, the better light-weight properties and mechanical strength. The flexural modulus is measured by three-point bending testing (in accordance with ISO 178 or JIS K 7171). The flexural modulus is measured in the atmosphere. The testing rate is 10 mm/min.

Figure 3:
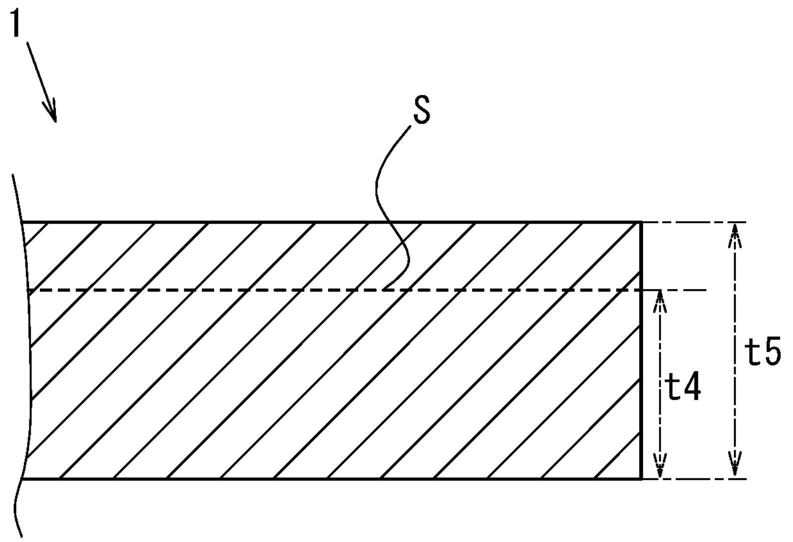
FIG. 3 is a cross-sectional view of the co-extruded sheet as found after heating.

The co-extruded sheet 1 is thermally shaped into a desired shape mainly through vacuum forming, for example. When a sheet from co-extrusion molding is heated, swelling (i.e., a swollen portion) may be caused on the surface of the sheet, which may deteriorate the appearance design quality of the sheet surface. In view of this, it is preferable to prevent the co-extruded sheet 1 from developing a swollen portion. As shown in FIG. 3, when the co-extruded sheet 1 is heated for 30 minutes in a heated atmosphere at 250° C., the average thickness t5 of the co-extruded sheet 1 after heating is not larger than 1.5 times the average thickness t4 of the co-extruded sheet before heating. The broken line denoted by S in FIG. 3 indicates the surface of the co-extruded sheet 1 before heating. That is, the co-extruded sheet 1 is prevented from developing a swollen portion due to heating, thereby reducing a change in thickness as determined by comparing the sheet before heating and the sheet after heating. As such, the co-extruded sheet 1 provides improved appearance design quality upon thermal shaping such as vacuum forming.

Figure 4:
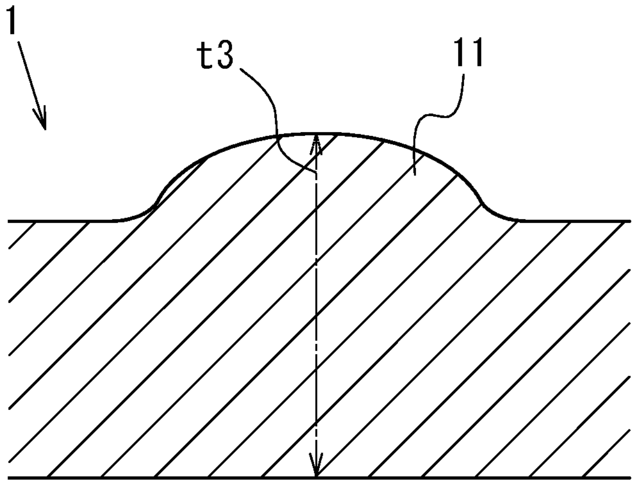
FIG. 4 is a cross-sectional view of the co-extruded sheet as found after heating.

Further, as shown in FIG. 4, the thickness t3 of the co-extruded sheet inclusive of the above-discussed swollen portion 11 is not larger than 1.5 times the average thickness t4 of the co-extruded sheet before heating shown in FIG. 3. The co-extruded sheet 1 after heating has less than one swollen portion 11 per 100 $cm^2$ of its surface. That is, in the co-extruded sheet 1, the height of the swollen portion 11 produced on the surface due to the heating is reduced, and the number of swollen portions 11 produced is also reduced. Thus, the co-extruded sheet 1 provides improved appearance design quality upon thermal shaping such as vacuum forming. A product thermally shaped from the co-extruded sheet is used in applications that particularly require appearance design quality, such as signboards, containers like suitcases, or interior/exterior automotive materials. In such applications, defects such as swellings on thermally shaped products are not desirable. In view of this, swelling during heating of the co-extruded sheet 1 is to be prevented as much as possible, and specifically there is to be less than one swollen portion 11.

The co-extruded sheet 1 may contain a large number of scale-like filler particles. The scale-like filler may be, for example, an inorganic filler, such as talc, calcium carbonate, mica, clay, boron nitride, wollastonite, potassium titanate, or glass flakes. The scale-like filler may be surface treated with a silane-based coupling agent, a titanate-based coupling agent, a phosphate ester-based coupling agent, or fatty acid-based coupling agent, for example. The scale-like filler particles have an aspect ratio not lower than 5. The aspect ratio is calculated by dividing the average diameter of the scale-like filler particles by their average thickness (average particle diameter/average thickness). If the aspect ratio of the scale-like filler particles is too low, it will be difficult to achieve good surface smoothness. In view of this, the aspect ratio of the scale-like filler particles is preferably not lower than 10, and more preferably not lower than 30. However, if the aspect ratio is too high, the flow rate of the mixed molten resin inside the die cannot easily be controlled during the manufacturing process described further below, which may deteriorate surface smoothness. In addition, an increase in the viscosity of the mixed molten resin during extrusion molding will be too large, which will generate heat inside the extrusion-molding equipment, as will be discussed further below, potentially causing thermal degradation of the thermoplastic resin. In view of this, the aspect ratio of the scale-like filler particles is to be lower than 50. The specific surface area of the scale-like filler is preferably 5 to 20 $m^2/g$. If the specific surface area of the scale-like filler is too small, surface smoothness is less likely to be achieved by sliding of the scale-like filler at the surface; if the specific surface area is too large, the resistance of the scale-like filler in the molten resin will be large and, as a result, it will be difficult to properly orient the scale-like filler particles.

The core layer 2 may contain, in a region near the boundary with the skin layer 3, scale-like filler particles oriented generally parallel to the boundary surface between the core layer 2 and skin layer 3. The near-boundary region is a defined, as determined along the thickness direction of the core layer 2, by the boundary surface between the core layer 2 and sky layer 3 and a position a thickness of 5% of the core-layer thickness away from the boundary surface. The bubbles contained in the core layer 2 have a shape extended along the direction of extrusion during extrusion molding. The scale-like filler particles are also oriented generally parallel to the bubble walls of the bubbles extended along the direction of extension, thereby improving the strength of the bubble walls. This will prevent rupturing along the direction of extrusion of the co-extruded sheet 1. "Scale-like filler particles being generally parallel" means that, in a cross section obtained by cutting the co-extruded sheet 1 in the thickness direction along the direction of extrusion during extrusion molding, the scale-like filler particles have an inclination not less than 0° and less than 5° relative to the boundary surface between the core layer 2 and skin layer 3. In other words, it means that the surfaces (i.e., major surfaces) of the scale-like filler particles face the boundary surface of the core layer 2 and skin layer 3 so as to be generally parallel to the surface. The same applies to the orientation of scale-like filler particles located in the core layer 2 and near the boundary between the core layer 2 and skin layer 4.

The orientation of a large number of scale-like filler particles contained in the region near the boundary between the core layer 2 and skin layer 3 were calculated in the following manner: First, in a cross section in a plane in the thickness direction and along the direction of extrusion during extrusion molding, 50 electron micrographs of 150 by 150 μm were taken, all with an equal distance from the front end to the rear end along the direction of extrusion in the near-boundary region and in the middle of the near-boundary region along the thickness direction. From among all the scale-like filler particles contained in these 50 electron micrographs, the ones oriented generally parallel to the boundary surface between the core layer 2 and skin layer 3 were identified. Then, the proportion of the scale-like filler particles oriented generally parallel in the large number of scale-like filler particles contained in the near-boundary region was calculated.

The core layer 2 may contain, in a middle region of the core layer 2 along the thickness direction, scale-like filler particles oriented with an angle of 5° to 90° relative to the surfaces of the co-extruded sheet 1. The middle region is a region with a thickness of 25% beginning at the middle along the thickness direction toward the boundary surface between the core layer 2 and skin layer 3, where the thickness of the core layer 2 is 100%. Preferably not less than 40% of the large number of scale-like filler particles contained in the middle region are oriented with an angle of 5° to 90° relative to the surface S of the co-extruded sheet 1. This will improve the formability of the co-extruded sheet 1. More preferably not less than 60%, and yet more preferably not less than 80%, of the scale-like filler particles are oriented with an angle of 5° to 90° relative to the surface.

This will further improve the formability of the co-extruded sheet 1. The bubbles contained in the middle region of the core layer 2 are likely to become larger than those in the near-boundary region discussed above during extrusion molding. This is because the middle region is not as easily cooled after extrusion as the near-boundary region. If the bubbles are too large, this may cause damage to the co-extruded sheet 1. If the scale-like filler particles in the middle region are inclined and randomly disposed between the bubbles, as discussed above, this will reduce growth of bubbles in all directions. This will improve the strength of the co-extruded sheet 1, or its strength during forming, i.e., formability. As a result, when a material constituted by the co-extruded sheet 1 is vacuum formed to fabricate a foam resin-molded product, rupturing of bubbles contained in the co-extruded sheet 1 or damage to the co-extruded sheet 1 will be prevented.

The orientation of the large number of scale-like filler particles contained in the middle region of the core layer 2 can be calculated in the following manner: First, similarly to the near-boundary region, 50 electron micrographs are taken, all with an equal distance and in the middle of the core layer 2 along the thickness direction. From among all the scale-like filler particles contained in these 50 electron micrographs, the ones oriented with an angle of 5° to 90° relative to the surface of the co-extruded sheet 1 are identified. Then, the proportion of the scale-like filler particles oriented with an angle of 5° to 90° relative to the surface of the co-extruded sheet 1 in the large number of scale-like filler particles contained in the middle region is calculated.

A method of manufacturing the co-extruded sheet 1 will be described below (not shown). First, resin pellets constituting a resin material are loaded into the screw cylinder of a main extruder. The resin material is a polycarbonate resin. The resin pellets are heated within the screw cylinder to produce a molten resin. Next, a blowing agent is injected into the molten resin from a blowing-agent injection bottle attached to the screw cylinder of the main extruder. The blowing agent is melted into the molten resin by the screw cylinder and kneaded to be uniformly dispersed. This results in a mixed molten resin. The mixed molten resin is discharged through the die outlet to form a core layer 2. Meanwhile, resin pellets constituting a resin material are loaded into each of the screw cylinders of two auxiliary extruders, heated and melted to produce two molten resins. One of the two molten resins is discharged through the associated die outlet to form a skin layer 3, while the other is discharged through the associated die outlet to form a skin layer 4. The mixed molten resin and the two molten resins from their respective extruders are brought together inside a die and discharged through the die outlet, where the skin layer 3 is laminated to one of the major surfaces of the core layer 2 and the skin layer 4 is laminated to the other major surface of the core layer 2. The mixed molten resin is foamed during extension through the die outlet into the atmosphere. This results in a co-extruded sheet 1. The foaming method is physical foaming using an inert gas, such as nitrogen or carbon dioxide, as a blowing agent. The co-extruded sheet 1 that has been extruded in this manner is transported by a haul-off machine to a cutter. The cutter cuts the co-extruded sheet 1 into a desired shape.

The co-extruded sheet 1 produced in this manner, which is then shaped into a desired shape by vacuum forming, for example, may be used in the following applications: For example, a wide product and part required to have relatively high strength, such as a signboard or a mobility material like an exterior automotive material; a product and part required to have heat resistance, such as a battery or a tray for heat-generating members used in a manufacturing process that includes a heating step; or a product and part required to be light-weight. Since the co-extruded sheet 1 contains a polycarbonate resin and has been foam molded through co-extrusion molding, it is a suitable material for forming such a product or part as listed above.

Figure 5:
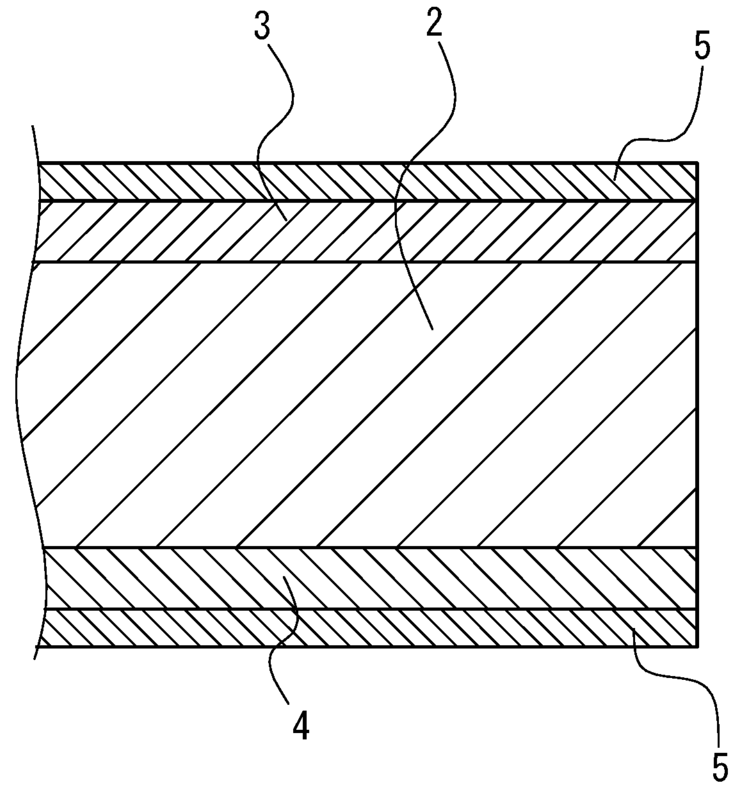
FIG. 5 is a cross-sectional view of a co-extruded sheet including decorative films.

Further, the co-extruded sheet 1 may have decorative films 5, as shown in FIG. 5. A decorative film 5 is laminated to the outer surface of at least one of the skin layers 3 and 4. The outer surface of the skin layer 3 is the surface of the skin layer 3 opposite the face facing the core layer 2. The same applies to the outer surface of the skin layer 4. A desired kind of the decorative film 5 may be selected from a plurality of kinds of the decorative film 5 with various designs provided thereon to provide a design quality suitable for the application of the molded product obtained by vacuum forming of the co-extruded sheet 1. Although not limiting, the decorative film 5 used may be, for example, a colored film, a film with any pattern printed or otherwise provided on the surface, a film with a pattern such as emboss texture, wood texture, stone texture or carbon texture, or a film with a metallic surface luster added by vapor deposition. The material of the decorative film 5 may be, for example, PC, PMMA, a PC/PMMA alloy, ABS, AES, PVC, or copolymerized PET. The co-extruded sheet 1 may be composed of three layers, i.e., a core layer 2 and skin layers 3 and 4, or may be composed of constructed by laminating a decorative film 5 to at least one of the skin layers 3 and 4.

A product and a part, for example, fabricated from the co-extruded sheet 1 help reduce the amount of resin used. As a result, the co-extruded sheet 1 according to the present embodiments will contribute to improving the efficiency with which natural resources are used, to alleviating transportation-related issues, to reducing the amount of energy used, and to reducing $CO_2$ emissions. Offering the co-extruded sheet 1 to society will contribute to achieving some of the 17 Sustainable Development Goals (SDGs) set by the United Nations: Goal 7 (affordable and clean energy); Goal 9 (industry, innovation and infrastructure); and Goal 11 (sustainable cities and communities).

Although embodiments have been described, the present disclosure is not limited to the above-described embodiments, and various modifications are possible without departing from the spirit of the invention.

EXAMPLES

As shown in Table 1 below, test specimens for Inventive Examples 1 to 10 and Comparative Examples 1 to 6 were fabricated, and tests were conducted to evaluate specific flexural modulus, whether a specimen was broken in harpy impact testing, and swelling on a test specimen when heated at 250° C. for 30 minutes. The resin material used for these test specimens is a polycarbonate resin. It should be noted that the present disclosure is not limited to these examples.

TABLE 1

| | Manufacturing method | Blowing agent | Thickness of skin layers (t1 + t2) (mm) | Thickness of specimen T (mm) | (t1 + t2)/T (mm) | Density of specimen (g/cm$^3$) | Expansion ratio | MVR ratio |
|---|---|---|---|---|---|---|---|---|
| Inv. Ex. 1 | co-extrusion | $N_2$ | 0.25 | 1.0 | 0.25 | 0.68 | 2.04 | 3.9 |
| Inv. Ex. 2 | co-extrusion | $N_2$ | 0.20 | 2.0 | 0.10 | 0.41 | 3.16 | 1.5 |
| Inv. Ex. 3 | co-extrusion | $N_2$ | 1.00 | 2.0 | 0.50 | 0.90 | 1.67 | 5 |
| Inv. Ex. 4 | co-extrusion | $N_2$ | 0.60 | 3.0 | 0.20 | 0.64 | 2.09 | 1.7 |
| Inv. Ex. 5 | co-extrusion | $N_2$ | 1.10 | 3.0 | 0.37 | 0.76 | 1.93 | 2.7 |
| Inv. Ex. 6 | co-extrusion | $N_2$ | 0.45 | 3.0 | 0.15 | 0.61 | 2.16 | 2.8 |
| Inv. Ex. 7 | co-extrusion | $N_2$ | 1.90 | 4.0 | 0.45 | 0.82 | 1.84 | 1 |
| Inv. Ex. 8 | co-extrusion | $N_2$ | 1.10 | 3.0 | 0.37 | 0.88 | 1.57 | 2.7 |
| Inv. Ex.9 | co-extrusion | $N_2$ | 1.10 | 3.0 | 0.37 | 0.82 | 1.73 | 2.7 |
| Inv. Ex.10 | co-extrusion | $N_2$ | 1.10 | 3.0 | 0.37 | 0.83 | 1.70 | 2.7 |
| Comp. Ex. 1 | co-extrusion | isopentane | 0.10 | 3.0 | 0.03 | 0.10 | 12.34 | 0.7 |
| Comp. Ex. 2 | extrusion laminating | isopentane | 0.15 | 2.3 | 0.07 | 0.11 | 11.65 | 1 |
| Comp. Ex. 3 | hot pressing | isopentane | 0.15 | 2.0 | 0.08 | 0.11 | 11.77 | 1 |
| Comp. Ex. 4 | injection | $N_2$ | 0.40 | 3.0 | 0.13 | 0.65 | 1.97 | 1 |
| Comp. Ex. 5 | co-extrusion | $N_2$ | 0.10 | 2.0 | 0.05 | 0.36 | 3.42 | 1.5 |
| Comp. Ex. 6 | co-extrusion | $N_2$ | 1.20 | 2.0 | 0.60 | 0.96 | 1.63 | 5 |

| | Dimensional change ratio (%) | Specific flexural modulus (GPa · cm$^3$/g) | Evaluation of specific flexural modulus | Sheet swelling/ swollen portion | Sheet swelling | Swollen portion | Broken or not |
|---|---|---|---|---|---|---|---|
| Inv. Ex. 1 | 0.0 | 2.09 | A | B | B | A | A |
| Inv. Ex. 2 | 0.0 | 1.75 | B | A | A | A | A |
| Inv. Ex. 3 | −1.2 | 2.03 | A | B | B | A | A |
| Inv. Ex. 4 | 1.0 | 2.01 | A | A | A | A | A |
| Inv. Ex. 5 | −0.5 | 2.17 | A | A | A | A | A |
| Inv. Ex. 6 | −0.1 | 1.88 | B | A | A | A | A |
| Inv. Ex. 7 | −0.2 | 2.17 | A | B | B | A | A |
| Inv. Ex. 8 | −0.5 | 1.86 | B | A | A | A | A |
| Inv. Ex.9 | −0.5 | 2.01 | A | A | A | A | A |
| Inv. Ex.10 | −0.5 | 1.97 | B | A | A | A | A |
| Comp. Ex. 1 | −15.0 | 1.40 | C | C | B | B | B |
| Comp. Ex. 2 | −23.0 | 1.30 | C | C | B | B | B |
| Comp. Ex. 3 | −24.0 | 1.30 | C | C | B | B | B |
| Comp. Ex. 4 | −5.0 | 2.00 | B | C | B | B | B |
| Comp. Ex. 5 | 0.0 | 1.38 | C | C | B | B | B |
| Comp. Ex. 6 | −1.3 | 2.00 | B | B | A | A | A |

Inventive Example 1

The test specimen for Inventive Example 1 was fabricated by co-extrusion molding in the following manner: First, a polycarbonate resin was loaded into the screw cylinder of a main extruder, and was sheared and kneaded while being heated at 270° C. Thereafter, a blowing agent constituted by $N_2$ was injected at a pressure of 4 MPa. The polycarbonate resin and blowing agent were heated at 215° C. to melt, and a core layer was produced with a die-outlet temperature of 215° C. Meanwhile, a polycarbonate resin was loaded into each of the screw cylinders of auxiliary extruders, and was sheared and kneaded while being heated at 255° C., and two skin layers were produced with a die-outlet temperature of 215° C. These core and skin layers were brought together inside a die and laminated, and discharged through the die outlet. This resulted in a test specimen for Inventive Example 1 with skin layers made of a non-foaming resin laminated to both major surfaces of the core layer made of a foam resin. The co-extrusion molding of the test specimen for Inventive Example 1 occurred with such a die outlet gap that the resulting thickness T of the test specimen for Inventive Example 1 was at the relevant value shown in Table 1 and with a haul-off speed of 0.7 m/min.

Inventive Examples 2 to 10

The test specimens for Inventive Examples 2 to 10 were fabricated by the same method as the test specimen for Inventive Example 1 except that the die outlet gap, the discharge flow rates of the main and auxiliary extruders and the haul-off speed were such that the thickness T of each specimen was at the relevant value shown in Table 1. This means that the test specimens for Inventive Examples 1 to 10 had different thicknesses.

Comparative Example 1

The test specimen for Comparative Example 1 was fabricated by co-extrusion molding in the following manner: First, a polycarbonate resin was loaded into the screw cylinder of a main extruder, and was sheared and kneaded while being heated at 270° C. Thereafter, such an amount of a blowing agent constituted by isopentane gas was injected that its resulting content was 0.53 mol/kg resin. The polycarbonate and blowing agent were heated at 215° C. to melt, and a core layer was produced with a die-outlet temperature of 215° C. Meanwhile, a polycarbonate resin was loaded into the screw cylinders of two auxiliary extruders, and was sheared and kneaded while being heated at 255° C., and two skin layers were produced with a die-outlet temperature of 215° C. These core and skin layers were brought together inside a die and laminated, and discharged through the die outlet. This resulted in a test specimen for Comparative Example 1 with skin layers made of a non-foaming resin laminated to both major surfaces of a core layer made of a foam resin. The co-extrusion molding of the test specimen for Comparative Example 1 occurred with such a die outlet gap that the resulting thickness T of the test specimen for Comparative Example 1 was at the relevant value shown in Table 1 and with a haul-off speed of 6.5 m/min.

Comparative Example 2

The test specimen for Comparative Example 2 was fabricated by extrusion laminating in the following manner: First, a polycarbonate resin was loaded into the screw cylinder of a main extruder, and was sheared and kneaded while being heated at 270° C. Thereafter, such an amount of a blowing agent constituted by isopentane gas was injected that its content was 0.53 mol relative to 1 kg of the loaded polycarbonate resin. The polycarbonate resin and blowing agent were heated at 200° C. to melt, and a core layer was produced with a die-outlet temperature of 200° C. The core layer was extrusion molded with such a die outlet gap that the resulting thickness T of the test specimen for Comparative Example 2 was at the relevant value shown in Table 1 and with a haul-off speed of 6.5 m/min. Next, while the discharged core layer was still molten, each of two skin layers made of a polycarbonate resin that had been fabricated in advance was bonded to the respective one of the major surfaces of the core layer for lamination.

Comparative Example 3

The test specimen for Comparative Example 3 was fabricated by laminating a core layer and skin layers together through thermocompression bonding. First, a core layer was produced in the same manner as for the test specimen for Comparative Example 2. Next, the core layer was cooled and solidified, and each of two skin layers made of a polycarbonate resin that had been fabricated in advance was laminated to the respective one of the major surfaces of the core layer through hot pressing.

Comparative Example 4

The test specimen for Comparative Example 4 was fabricated by injection molding. A polycarbonate resin was loaded into the screw cylinder of the injection molder, and was sheared and kneaded while being heated at 270° C. Thereafter, a blowing agent constituted by nitrogen was injected at a pressure of 8 Mpa, and the polycarbonate resin with the blowing agent injected therein was allowed to fill the die. Then, the core-back method was used to release pressure in the die to produce the test specimen. The die was designed such that the resulting test specimen had a thickness of 3 mm.

The densities of the test specimens shown in Table 1 were calculated in the following manner: A sheet-shaped test specimen with a dimension of 400 mm in the direction of extrusion was cut out. A cut surface of the test specimen along the width direction was equally divided into 11 sub-sections arranged in the width direction, and the thicknesses at 10 points with an equal distance, other than the ends, were measured and the arithmetic mean of these thicknesses was determined, which was treated as the average thickness of the test specimen. The lengths of the sides of the test specimen in the width direction and in the direction of extrusion were measured using a measuring tape, and the volume of the test specimen was calculated from the lengths of the sides and the average thickness. In addition, the weight of the test specimen was measured using an electronic balance, and the weight of the test specimen was divided by the volume to determine the density of the test specimen.

The dimensional change ratios shown in Table 1 were calculated in the following manner: First, a sheet-shaped test specimen was cut into a sample with a size of 120 mm by 120 mm. Here, a sample was taken from each of the middle and both ends of the entire width of the test specimen. The middle refers to the position at a distance of ½ of the entire width of the test specimen, and both ends refer to the positions 50 mm distant from the extreme ends of the entire width of the test specimen. Each sample was marked to indicate the direction of extrusion and the width direction, and the middle of each sample was marked to enable measurement of its gauge lengths in the direction of extrusion and in the width direction. The gauge lengths in the direction of extrusion and the width direction were measured using a scale ruler or a carpenter's square capable of measuring 0.5 mm at the minimum. Thereafter, a metallic container with a polytetrafluoroethylene (PTFE) sheet laid on its inner bottom surface was placed in a drier, and the temperature of the drier was adjusted such that the temperature of the metallic container was 200+2° C. The sample was placed in the metallic container and heated for 30 minutes. After completion of the heating process, the sample was taken out of the metallic container and was left to cool to room temperature, and the gauge lengths in the direction of extrusion and the width direction were measured. Then, the dimensional change ratio was calculated by the expression given above. For every one of the test specimens, the absolute value of the dimensional change ratio in the direction of extrusion was higher than the dimensional change ratio in the width direction; in view of this, Table 1 shows the dimensional change ratios in the direction of extrusion. In other words, for each specimen, the dimensional change ratio in the width direction was lower than the dimensional change ratio in the direction of extrusion. Thus, the dimension in the width direction was more stable during the heating than that in the direction of extrusion.

The thicknesses T and specific flexural modulus of the test specimens shown in Table 1 were measured in accordance with the above-described measurement method. Further, an MVR ratio shown in Table 1 is the ratio of the MVR of the polycarbonate resin contained in the skin layers to that of the polycarbonate resin contained in the core layer, and was measured by the above-described measurement method. For evaluation of specific flexural modulus, a specimen with a specific flexural modulus higher than 2.0 GPa·cm$^3$/g was graded as "A", a specimen with a constant higher than 1.5 GPa·cm$^3$/g and not higher than 2.0 GPa·cm$^3$/g as "B", and a specimen with a constant not higher than 1.5 GPa·cm$^3$/g as "C".

In Table 1, "Broken or not" indicates whether a test specimen was broken by impact testing. With Charpy impact testing (in accordance with ISO 179-1 and JIS K 7111-1), a flatwise vertical test was conducted on each test specimen without a notch, and a 4J pendulum was used to evaluate whether the specimen was broken. A test specimen that was only bent without suffering a complete break, a hinge break or a partial break was graded as "A", indicating that it was not broken; otherwise, a test specimen was determined to be broken and graded as "B".

In Table 1, "Sheet swelling/swollen portion" indicates a surface swelling of a sheet-shaped test specimen after heating. A surface swelling refers to such a swollen portion as defined above. Each test specimen was evaluated for the present/absence of a sheet swelling after heating at a temperature of 250° C. for 30 minutes. Specifically, the method was as follows: The average thickness of a test specimen before heating was calculated. A cut surface of the test specimen was observed using a micrometer, and the cut surface of the test specimen was equally divided into 11 sub-sections arranged in the width direction, and the thicknesses at 10 points with an equal distance other than the ends were measured and the arithmetic mean of these thicknesses was treated as the average thickness. The average thickness of the test specimen after heating was calculated in the same manner as the test specimen before heating. Further, the test specimen after heating was visually observed to determine whether there was a swollen portion as compared with the surface of the test specimen before heating. If a swollen portion was observed visually, a portion of the cut surface including the swollen portion was observed using a microscope to measure the thickness of the test specimen inclusive of the swollen portion, t3 (see FIG. 4). A test specimen after heating having an average thickness t5 larger than 1.5 times the average thickness t4 of the test specimen before heating and a thickness t3 inclusive of the swollen portion larger than 1.5 times the average thickness t4 of the test specimen before heating was determined to have a surface swelling, and a specimen with one or more swollen portions was graded as "C" and a specimen with less than one swollen portion as "B"; otherwise, a specimen was graded as "A". Regarding "Sheet swelling" in Table 1, a test specimen after heating having an average thickness t5 not larger than 1.5 times the average thickness t4 of the test specimen before heating was graded as "A", and a specimen with an average thickness t5 larger than 1.5 times as "B". Regarding "Swollen portion" in Table 1, a test specimen having a thickness t3 inclusive of a swollen portion larger than 1.5 times the average thickness t4 of the test specimen before heating was determined to have a surface swelling; a specimen with one or more swollen portions was graded as "B", and a specimen with less than one swollen portion as "A". The method of heating a test specimen was as follows: First, a test specimen was cut into a sample with a size of 100 mm by 100 mm. Here, a sample was taken from each of the middle and both ends of the entire width of the test specimen. The middle refers to the position at a distance of ½ of the entire width of the sheet, and both ends refer to positions 50 mm distant from the extreme ends of the entire width of the sheet. A metallic container with a polytetrafluoroethylene (PTFE) sheet laid on its inner bottom surface was placed in an electric furnace, and the temperature of the electric furnace was adjusted such that the temperature of the metallic container was 250+2° C. The cut sample was placed in the metallic container and heated for 30 minutes. After completion of the heating process, the sample was taken from the metallic container. The sample was left to cool to room temperature before the surface condition of the sample was visually observed.

Test Results

Regarding the ratio of the total thickness of the skin layers (t1+t2) to the thickness T of the co-extruded sheet, the ones of Inventive Examples 1 to 10 that had a thickness ratio {(t1+t2)/T} of 0.10 to 0.5 are graded as "B" or better for evaluation of all of "Specific flexural modulus", "Sheet swelling/swollen portion" and "Broken or not", and graded as "A" for "Swollen portion". Especially the ones with a thickness ratio of 0.20 to 0.40 and a specimen density of 0.4 to 0.9 g/cm$^3$ are graded as "A" for evaluation of "Specific flexural modulus" and "Broken or not". In other words, light-weight properties and mechanical strength were improved by adjusting the thickness ratio between the skin layer 3 and core layer 2 of the co-extruded sheet, {(t1+t2)/T}, to be 0.20 to 0.40 and adjusting the density to be 0.4 to 0.9 g/cm$^3$. For evaluation of "Sheet swelling", relatively many, i.e., not fewer than 70%, of Inventive Examples 1 to 10 are graded as "A", showing that Inventive Examples 10 had relatively reduced "sheet swelling". Further, it can be assumed that co-extruded sheets can provide good appearance design quality after vacuum forming if the "[s]heet swelling" is not larger than 1.5 times. Although the test specimens were heated at a temperature of 250° C. in the above-described tests, it can be assumed that, if a test specimen is heated at a temperature of 200° C., the evaluation result for "Sheet swelling/swollen portion" will be the same.

Next, regarding the MVR ratio between the resins of the skin layer 3 and core layer 2 of a test specimen, the ones of Inventive Examples 1 to 7 having an MVR ratio of 1 to 5 are graded as "B" or better for evaluation of all of "Specific flexural modulus", "Sheet swelling/swollen portion" and "Broken or not". Especially the ones with an MVR ratio of 1.5 to 3 are graded as "A" for evaluation of both "Sheet swelling/swollen portion" and "Broken or not". This means that, if the ratio of the MVR of the resin contained in the skin layer 3 is 1.5 to 3, irregular-sized bubbles in the core layer 2 of the co-extruded sheet 1 are likely to become uniform, thereby improving the secondary workability in vacuum forming, for example, of the co-extruded sheet 1. Further, Inventive Examples 4 and 5 are graded as "A" for evaluation of all of "Specific flexural modulus", "Sheet swelling/swollen portion" and "Broken or not". This shows that the thickness ratio is preferably not lower than 0.20 and not higher than 0.40, the density of the test specimen (i.e., sheet) is preferably not lower than 0.6 g/cm$^3$ and not higher than 0.8 g/cm$^3$, and the MVR ratio is preferably not lower than 1.7 and not higher than 2.7. Although the test specimens were heated at a temperature of 250° C. in the above-described tests, it can be assumed that, if a test specimen is heated at a temperature of 200° C., the evaluation result for "Sheet swelling/swollen portion" will be the same.

Regarding the expansion ratio of the test specimens for Inventive Examples 1 to 10, the test specimen for Inventive Example 8, which had an expansion ratio of 1.57, had a lower specific flexural modulus than the other inventive examples. On the other hand, Comparative Example 5, which was produced through co-extrusion as was the case with the inventive examples, had an expansion ratio of 3.42, and had a specific flexural modulus of 1.38, which is significantly lower. Further, the test specimen for Comparative Example 6 had an expansion ratio of 1.63 and a specific flexural modulus of 2.00, which is a relatively good result; however, it had a density of 0.96, which means inferior light-weight properties. This suggests that, to provide good light-weight properties and mechanical strength while taking care to provide a certain thickness ratio {(t1+t2)/T} and/or density, for example, of the co-extruded sheet, the expansion ratio of the co-extruded sheet is to be 1.6 to 3.3. It is to be noted that, for the test specimen for Inventive Example 2, the specific flexural modulus was 1.75 GPa·cm$^3$/g while the expansion ratio was 3.16, showing a tendency of slight decrease. This suggests that the expansion ratio of the co-extruded sheet is more preferably 1.6 to 3.1.

A comparison of the densities of Inventive Examples 5 and 8 to 10, which had the same thickness ratio {(t1+t2)/T} of 0.37, shows that each of Inventive Examples 5 and 9, which had a density not higher than 0.82 g/cm$^3$, had a specific flexural modulus not lower than 2.00 GPa·cm$^3$/g, a relatively good results, while each of Inventive Examples 8 and 10, which had a density not lower than 0.83 g/cm$^3$, had a somewhat lower specific flexural modulus. Thus, while the density of a co-extruded sheet is to be 0.4 to 0.9 g/cm$^3$, a density not higher than 0.82 g/cm$^3$, i.e., 0.4 to 0.82 g/cm$^3$, achieved better light-weight properties and mechanical strength.

Comparative Examples 1 to 3 were low-density laminated polycarbonate resin sheet with a blowing agent constituted by isopentane gas. The density of each of the test specimens for Comparative Examples 1 to 3 was 0.1 to 0.11, i.e., lower than 0.4. Further, for each of the test specimens for Comparative Examples 1 to 3, the ratio of the thickness of the skin layers (t1+t2) to the thickness T of the test specimen was lower than 0.10. As a result, bubbles had a generally flat shape extended significantly along the direction of extrusion.

The test specimens for Comparative Examples 1 to 3 had higher expansion ratios due to the use of organic, volatile isopentane gas for a blowing agent. As such, the surface of each of the test specimens after extrusion foam-molding had conspicuous irregularities due to ruptured bubbles. Further, due to the relatively high shear rate during extrusion molding, the test specimens were significantly extended along the direction of extrusion. As a result, bubbles had a generally flat shape extended significantly along the direction of extrusion. For these reasons, heating the test specimens in an atmosphere at the glass-transition temperature of the polycarbonate resin or higher was more likely to cause bubbles inside the test specimen to contract. Comparative Examples 1 to 3 are thought to have had increased dimensional change ratios due to significant contraction along the direction of extrusion. It can be assumed that such significantly extended, generally flat bubbles further decreased the density of the test specimens and thus decreased the flexural modulus of the test specimens, and made it more likely that the test specimen broke. Generally, a foam molding composed of a polycarbonate resin is considered to have good light-weight properties and mechanical strength. However, in the above-described tests, the test specimens for Comparative Examples 1 to 3 failed to provide good flexural modulus and impact properties. On the other hand, as shown above, the test specimens for Inventive Examples 1 to 7, for which care was taken to provide a certain thickness of the skin layers (t1+t2) relative to the thickness T of the test specimen and the specimen density was 0.4 to 0.9 g/cm$^3$, provided good light-weight properties and mechanical strength and also improved appearance design quality when heated under vacuum-forming conditions.

Comparative Example 4 was a sheet-shaped test specimen fabricated through injection molding. For a test specimen fabricated through injection molding, the cooling-rate distribution inside the die causes formation of a skin layer as a surface layer of the test specimen.

Comparative Example 4 is graded as "C" for evaluation of "Sheet swelling/swollen portion", and "B" for evaluation of "Sheet swelling" and "Swollen portion". It is assumed that, since the resin forming the skin layers of a test specimen fabricated through injection molding contained a blowing agent, the blowing agent expanded during heating and caused formation of a large number of relatively large swollen portions on the surfaces of the test specimen. Thus, a co-extruded sheet is distinguished from a molding from injection molding.

Comparative Example 5 is graded as "C" for evaluation of "Specific flexural modulus" and "Sheet swelling/swollen portion", and "B" for evaluation of "Sheet swelling", "Swollen portion" and "Broken or not".

Comparative Example 6 had relatively good mechanical strength and appearance design quality when heated under vacuum-forming conditions.

However, Comparative Example 6 had a density higher than 0.9 g/cm$^3$, failing to reduce weight.

REFERENCE SIGNS LIST

1: co-extruded sheet
2: core layer
3: skin layer
4: skin layer
5: decorative films
11: swollen portion
T: thickness
t1: thickness
t2: thickness
t3: thickness
t4: average thickness
t5: average thickness

The invention claimed is:

1. A co-extruded sheet containing a polycarbonate resin, comprising:
- a core layer formed from a foam resin;
- a first skin layer formed from a non-foaming resin and laminated to one major surface of the core layer; and
- a second skin layer laminated to another major surface of the core layer, wherein:
- the polycarbonate resin contained in the first and second skin layers has a melt volume-flow rate 1 to 5 times a melt volume-flow rate of the polycarbonate resin contained in the core layer,
- the co-extruded sheet has a density of 0.4 to 0.9 g/cm$^3$,
- the co-extruded sheet has a thickness of 1 to 5 mm and satisfies the following expression (1):

$$0.10 \leq (t1 + t2)/T \leq 0.5, \quad (1)$$

- in expression (1), t1 indicates a thickness of the first skin layer, t2 indicates a thickness of the second skin layer, and T indicates a thickness of the co-extruded sheet;
- when heated for 30 minutes in a heated atmosphere at 250° C., the co-extruded sheet includes a swollen portion produced on a surface of the co-extruded sheet due to the heating;
- a thickness t3 of the co-extruded sheet inclusive of the swollen portion is not larger than 1.5 times an average thickness t4 of the co-extruded sheet before the heating; and
- the co-extruded sheet after the heating has less than one swollen portion per 100 cm$^2$ of the surface.

2. The co-extruded sheet according to claim 1, wherein the polycarbonate resin contained in the first and second skin layers has a melt volume-flow rate 1.5 to 3 times a melt volume-flow rate of the polycarbonate resin contained in the core layer.

3. The co-extruded sheet according to claim 1, wherein the co-extruded sheet has a density not higher than 0.82 g/cm$^3$.

4. The co-extruded sheet according to claim 1, wherein, when the co-extruded sheet is heated for 30 minutes in an atmosphere at 200° C., the co-extruded sheet has a dimensional change ratio of −5 to 0% as measured along at least one of a direction of extrusion and a width direction perpendicular to the direction of extrusion in planner view.

5. The co-extruded sheet according to claim 1, wherein the co-extruded sheet has a specific flexural modulus not lower than 1.5 $GPa \cdot cm^3/g$.

6. The co-extruded sheet according to claim 1, wherein the co-extruded sheet has a specific flexural modulus not lower than 2 $GPa \cdot cm^3/g$.

7. The co-extruded sheet according to claim 1, wherein:

the co-extruded sheet further includes a decorative film; and the decorative film is laminated to an outer surface of at least one of the first and second skin layers.

8. The co-extruded sheet according to claim 1, wherein the co-extruded sheet has a density not less than 0.61 $g/cm^3$.

9. A co-extruded sheet containing a polycarbonate resin, comprising:

a core layer formed from a foam resin;

a first skin layer formed from a non-foaming resin and laminated to one major surface of the core layer; and a second skin layer laminated to another major surface of the core layer, wherein:

the polycarbonate resin contained in the first and second skin layers has a melt volume-flow rate 1 to 5 times a melt volume-flow rate of the polycarbonate resin contained in the core layer, the co-extruded sheet has a density of 0.4 to 0.9 $g/cm^3$, the co-extruded sheet has a thickness of 1 to 5 mm and satisfies the following expression (1):

$$0.10 \leq (t1 + t2)/T \leq 0.5, \quad (1)$$

in expression (1), t1 indicates a thickness of the first skin layer, t2 indicates a thickness of the second skin layer, and T indicates a thickness of the co-extruded sheet; and, when the co-extruded sheet is heated for 30 minutes in a heated atmosphere at 250° C., an average thickness t5 of the co-extruded sheet after the heating is not larger than 1.5 times an average thickness t4 of the co-extruded sheet before the heating.

10. The co-extruded sheet according to claim 9, wherein the co-extruded sheet has a density not higher than 0.82 $g/cm^3$.

11. The co-extruded sheet according to claim 9, wherein, when the co-extruded sheet is heated for 30 minutes in an atmosphere at 200° C., the co-extruded sheet has a dimensional change ratio of −5 to 0% as measured along at least one of a direction of extrusion and a width direction perpendicular to the direction of extrusion in planner view.

12. The co-extruded sheet according to claim 9, wherein the co-extruded sheet has a specific flexural modulus not lower than 1.5 $GPa \cdot cm^3/g$.

13. The co-extruded sheet according to claim 9, wherein the co-extruded sheet has a density not less than 0.61 $g/cm^3$.

14. A co-extruded sheet containing a polycarbonate resin, comprising:

a core layer formed from a foam resin;

a first skin layer formed from a non-foaming resin and laminated to one major surface of the core layer; and a second skin layer laminated to another major surface of the core layer, wherein:

the polycarbonate resin contained in the first and second skin layers bas a melt volume-flow rate 1 to 5 times a melt volume-flow rate of the polycarbonate resin contained in the core layer, the co-extruded sheet has a density of 0.4 to 0.9 $g/cm^3$, the co-extruded sheet has a thickness of 1 to 5 mm and satisfy the following expression (1):

$$0.10 \leq (t1 + t2)/T \leq 0.5, \quad (1)$$

in expression (1), t1 indicates a thickness of the first skin layer, t2 indicates a thickness of the second skin layer, and T indicates a thickness of the co-extruded sheet; and the core layer has an expansion ratio of 1.6 to 3.3.

15. The co-extruded sheet according to claim 14, wherein the co-extruded sheet has a density not higher than 0.82 $g/cm^3$.

16. The co-extruded sheet according to claim 14, wherein, when the co-extruded sheet is heated for 30 minutes in an atmosphere at 200° C., the co-extruded sheet has a dimensional change ratio of −5 to 0% as measured along at least one of a direction of extrusion and a width direction perpendicular to the direction of extrusion in planner view.

17. He co-extruded sheet according to claim 14, wherein the co-extruded sheet has a specific flexural modulus not lower than 1.5 $GPa \cdot cm^3/g$.

18. The co-extruded sheet according to claim 14, wherein the co-extruded sheet has a density not less than 0.61 $g/cm^3$.

* * * * *